US012774707B2

(12) United States Patent
Uruena Montoya

(10) Patent No.: US 12,774,707 B2
(45) Date of Patent: Oct. 27, 2026

(54) HYDRAULIC PUMP TOOL SYSTEMS AND METHODS

(71) Applicant: Milwaukee Electric Tool Corporation, Brookfield, WI (US)

(72) Inventor: Jean Mauricio Uruena Montoya, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/819,432

(22) Filed: Aug. 29, 2024

(65) Prior Publication Data

US 2025/0065484 A1 Feb. 27, 2025

(51) Int. Cl.

| | |
|---|---|
| ***B25F 5/00*** | (2006.01) |
| ***F04D 17/08*** | (2006.01) |
| ***F04D 29/62*** | (2006.01) |
| ***F15B 15/18*** | (2006.01) |

(52) U.S. Cl.
CPC ........... *F04D 29/626* (2013.01); *F04D 17/08* (2013.01); *F15B 15/18* (2013.01)

(58) Field of Classification Search
CPC .... B25F 5/005; B25F 5/02; B25F 3/00; F04D 17/08; F15B 15/18; F15B 13/02; B23D 17/06
See application file for complete search history.

(56) References Cited

U.S. PATENT DOCUMENTS

| | | | | |
|---|---|---|---|---|
| 3,819,153 | A * | 6/1974 | Hurst | B66F 3/24 72/392 |
| 6,863,502 | B2 * | 3/2005 | Bishop | F04B 23/103 417/42 |
| 7,428,812 | B2 | 9/2008 | Montminy et al. | |
| 7,464,578 | B2 | 12/2008 | Ayer et al. | |
| 7,487,654 | B2 | 2/2009 | Lefavour et al. | |
| 7,624,187 | B1 | 11/2009 | Gilmartin et al. | |
| 8,056,473 | B2 | 11/2011 | Frenken | |
| 8,721,300 | B2 | 5/2014 | Schuetzle et al. | |
| 9,074,590 | B2 | 7/2015 | Schuetzle et al. | |
| 9,180,583 | B2 | 11/2015 | Frenken | |
| 10,562,254 | B2 | 2/2020 | Frenken | |
| 10,646,987 | B2 | 5/2020 | Barezzani | |
| 10,731,637 | B2 | 8/2020 | Walmsley et al. | |
| 10,799,962 | B2 | 10/2020 | Barezzani et al. | |
| 11,204,022 | B2 | 12/2021 | Westling et al. | |

(Continued)

FOREIGN PATENT DOCUMENTS

| | | |
|---|---|---|
| CN | 208907398 U | 5/2019 |
| CN | 211231110 U | 8/2020 |

*Primary Examiner* — Andrew M Tecco
*Assistant Examiner* — Nicholas E Igbokwe
(74) *Attorney, Agent, or Firm* — Quarles & Brady LLP

(57) ABSTRACT

A hydraulic tool can include a pump, a head detached from the pump, and a hose connected between the head and the pump. The pump can pressurize hydraulic fluid within the pump. The head can receive pressurized hydraulic fluid from the pump. The hose can be connected to a pump outlet at a first end and connected to a head inlet at a second, opposite, end to direct pressurized hydraulic fluid from the pump outlet to the head inlet. The hydraulic tool can further include a first control button arranged on the head to trigger the pump to begin directing pressurized hydraulic fluid from the pump outlet to the head inlet via the hose.

20 Claims, 10 Drawing Sheets

(56) References Cited

U.S. PATENT DOCUMENTS

| | | | | |
|---|---|---|---|---|
| 2017/0087709 | A1* | 3/2017 | Barezzani | B25B 27/146 |
| 2017/0252911 | A1* | 9/2017 | Barezzani | F04B 17/03 |
| 2018/0161890 | A1* | 6/2018 | Barezzani | B23D 29/002 |
| 2018/0335024 | A1* | 11/2018 | Hughes | F04B 1/04 |
| 2019/0217357 | A1 | 7/2019 | Ruch et al. | |
| 2020/0001446 | A1* | 1/2020 | Ballard | F04B 23/06 |
| 2020/0149561 | A1* | 5/2020 | Hughes | F15B 9/03 |
| 2020/0173430 | A1 | 6/2020 | Hughes et al. | |
| 2024/0191728 | A1* | 6/2024 | Kriefall | F15B 11/165 |

* cited by examiner

HYDRAULIC PUMP TOOL SYSTEMS AND METHODS

CROSS-REFERENCE TO RELATED APPLICATIONS

This application claims the benefit of U.S. Provisional Patent Application No. 63/578,348, filed Aug. 29, 2023, which is incorporated by reference herein in its entirety.

BACKGROUND

Hydraulic tools (e.g., hydraulic knockout punch tools, crimpers, cutters, PEX expanders, etc.) may be used to create an opening, crimp, cut, or otherwise modify a workpiece (e.g., sheet metal, PEX piping, etc.). However, typical hydraulic tools may be unable to fit into tight spaces (e.g., electrical panels, etc.) due to the size of the tool. For example, the tool may include a pump in order to generate sufficient force (e.g., hydraulic pressure) to modify the workpiece. However, the pump may be secured to a working component (e.g., a head) of the tool as a unitary assembly, which may prevent the operator from maneuvering the tool into tight (e.g., small) workspaces. Thus, typical hydraulic tools may prevent an operator from efficiently working on a workpiece within tight space limitations (e.g., electrical panels, etc.).

SUMMARY

Embodiments of the disclosure provide a hydraulic tool including a pump and a head connected between the head and the pump by a hose. The pump pressurizes hydraulic fluid, and the head receives the pressurized hydraulic fluid from the pump. The hose can be connected to a pump outlet at a first end and connected to a head inlet at a second end to direct pressurized hydraulic fluid from the pump outlet to the head inlet. The hydraulic tool can further include a first control button arranged on the head to trigger the pump to begin directing pressurized hydraulic fluid from the pump outlet to the head inlet via the hose.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
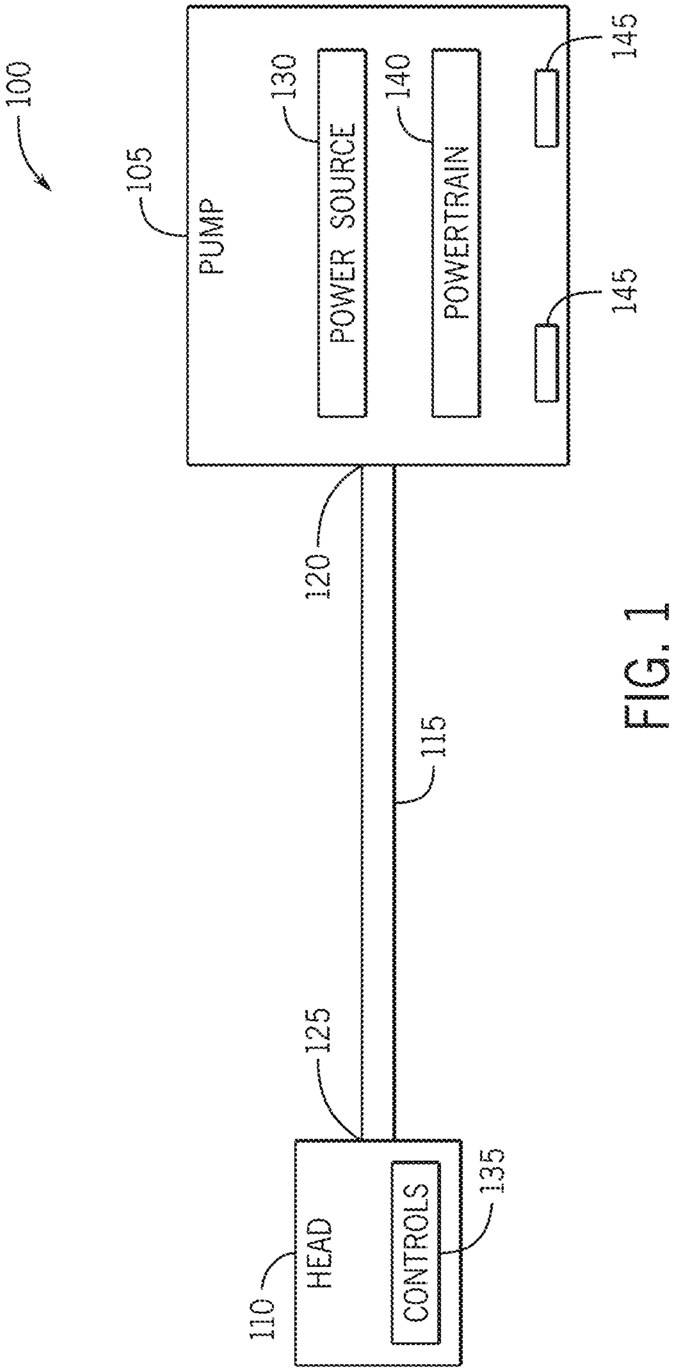
FIG. 1 is a diagrammatic view of a hydraulic tool according to aspects of the present disclosure.

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The disclosed hydraulic tool will be described with respect to an example hydraulic tool (e.g., a hydraulic knockout punch). However, it should be understood that any one or more example embodiments of the disclosed hydraulic tool could be incorporated in alternate forms of a hydraulic tool (e.g., in a hydraulic crimper/cutter, PEX expander, press, or any other known hydraulic tool). Furthermore, it should be understood that one or more example embodiments of the disclosed hydraulic tool could be used outside of the context of a hydraulic tool and could more generally be used in a mechanism and/or mechanisms that generate/generates hydraulic force.

In one example, the hydraulic tool described below is configured to permit a user to perform work on a workpiece (e.g., punch holes, cut, crimp, expand, etc.), even with minimal space around the workpiece. For example, the tool may permit a user to create openings in a crowded electrical panel. The tool may include a pump and a head, which may be separate components connected via a hose. The pump may be configured to pressurize hydraulic fluid and transmit the fluid to the head via the hose. In one example, the head may be significantly smaller in size than the pump, so that the head may be easily manipulated by a user. To further facilitate ease of use of the tool, the head may include one or more local controls (e.g., to control actuation of a cutting die, etc.). In some examples, the pump may include one or more magnets to permit a user to secure the pump adjacent a work surface in a hands-free arrangement, which reduces the overall fatigue of a user.

FIG. 1 illustrates one example of a hydraulic tool 100. In one example, the hydraulic tool 100 may be a hydraulic knockout punch configured to create openings in a desired material. In another example, the hydraulic tool 100 may be a hydraulic crimper/cutter, PEX expander, or any other known hydraulic tool. The hydraulic tool 100 may include a pump 105 and a head 110. In some examples, the pump 105 and the head 110 may be physically separate, but fluidically connected via a hose 115. Put differently, the pump 105 and the head 110 may be separate, detached components that are connected together via the hose 115. Thus, a single pump 105 may be connected to a variety of heads 110 depending on the intended use case. Put differently, one or more heads may be interchanged via disconnecting a first head from the hose and reconnecting a second, different head to the hose. For example, the pump 105 may be connected to a cutting head, a crimping head, a knockout head, press head, etc. In some other examples, instead of interchanging the head, a single head may be used, but one or more accessories (e.g., cutting blades, crimping dies, punches, or other head accessories) may be interchanged (e.g., secured to or removed from) the head. Correspondingly, in some examples, the pump 105 may be interchangeable with a single head 110. For example, different size pumps 105 (e.g., higher or lower pressure pumps) may be used with a variety of heads depending on the intended use case. Thus, the modularity of the hydraulic tool 100 may facilitate the use of the tool 100 in a variety of work locations for a variety of projects. Further, the separation between the head 110 and the pump 105 may permit an operator to maneuver the head 110 inside of tight spaces (e.g., junction boxes, etc.), without having to also fit the pump with.

In some examples, to connect the pump 105 and the head 110, the hose 115 may be connected to an outlet port 120 of the pump 105 at a first end of the hose and connected to an inlet port 125 of the head 110 at a second, opposite end of the hose. Thus, hydraulic fluid from the pump 105 may be pressurized and flow through the hose 115 from the outlet port 120 to the inlet port 125. Once the pressurized fluid reaches the head 110, the fluid may generate pressure within the head 110, which may facilitate an action (e.g., cutting, crimping, punching, expanding, etc.) based on the head 110 type. In one example, the hose 115 may be of a sufficiently small diameter to permit a user to easily maneuver the head 110 without interference from the hose 115. In another example, the diameter of the hose 115 may be sized to maximize a pressure of hydraulic fluid sent to the head 110 from the pump 105. As should be appreciated, the hose 115 may be made from a variety of materials depending on the intended use case (e.g., rubber, polymeric materials, metallic materials, etc.).

In some examples, the pump 105 may be in the form of a hydraulic pump configured to pressurize hydraulic fluid in order to power the head 110. For example, the pump 105 may pressurize hydraulic fluid, which may then be forced through the outlet port 120, hose 115, and inlet port 125 before entering the head 110 in order to actuate the head 110. In some examples, the pump 105 may include a powertrain 140 (e.g., one or more gearsets, a motor, a piston, etc.). The powertrain 140 may be configured to pressurize the hydraulic fluid within the pump 105 for use in actuation of the head 110. In some examples, the powertrain 140 may be powered via a power source 130. In some examples, the power source 130 may be a wired or a wireless power source. For example, the power source 130 may be a removable, rechargeable, battery (e.g., a lithium-ion battery). In another example, the power source 130 may be a wall plug. In some examples, the pump 105 may include an inverter or a rectifier to convert alternating current (AC) to direct current (DC) or DC to AC. In some examples, the pump may be configured for use with both a battery and a wall plug.

In some examples, to facilitate ease of use of the tool 100, the pump 105 may include a mounting assembly 145. The mounting assembly 145 may permit an operator to selectively secure the pump adjacent to a work location. For example, the mounting assembly may include one or more magnets, hooks, tabs, or other mounting components, which may permit an operator to secure the pump 105 to a work location. For example, the operator may position the pump 105 nearby to a work location so that the head 110 may be positioned within the work location. Thus, the operator may operate the head 110 of the tool 100 without having to hold the pump 105.

In some examples, to facilitate the use of the tool 100 without having to hold the pump 105, the head 110 may include one or more controls 135 positioned on the head 110. In some examples, the controls 135 may be configured to control one or more operations of the pump 105 or the head 110. For example, the controls 135 may be configured to activate the pump 105 (e.g., to pressurize hydraulic fluid). The controls 135 may further control one or more valves within the pump 105 or the head 110 to permit or prohibit hydraulic fluid flow into or out of the head 110. Thus, by having the controls 135 locally positioned on the head 110 of the tool 100, the operator may be able to perform work on a workpiece, without needing to interact with the pump 105 directly.

Figure 2:
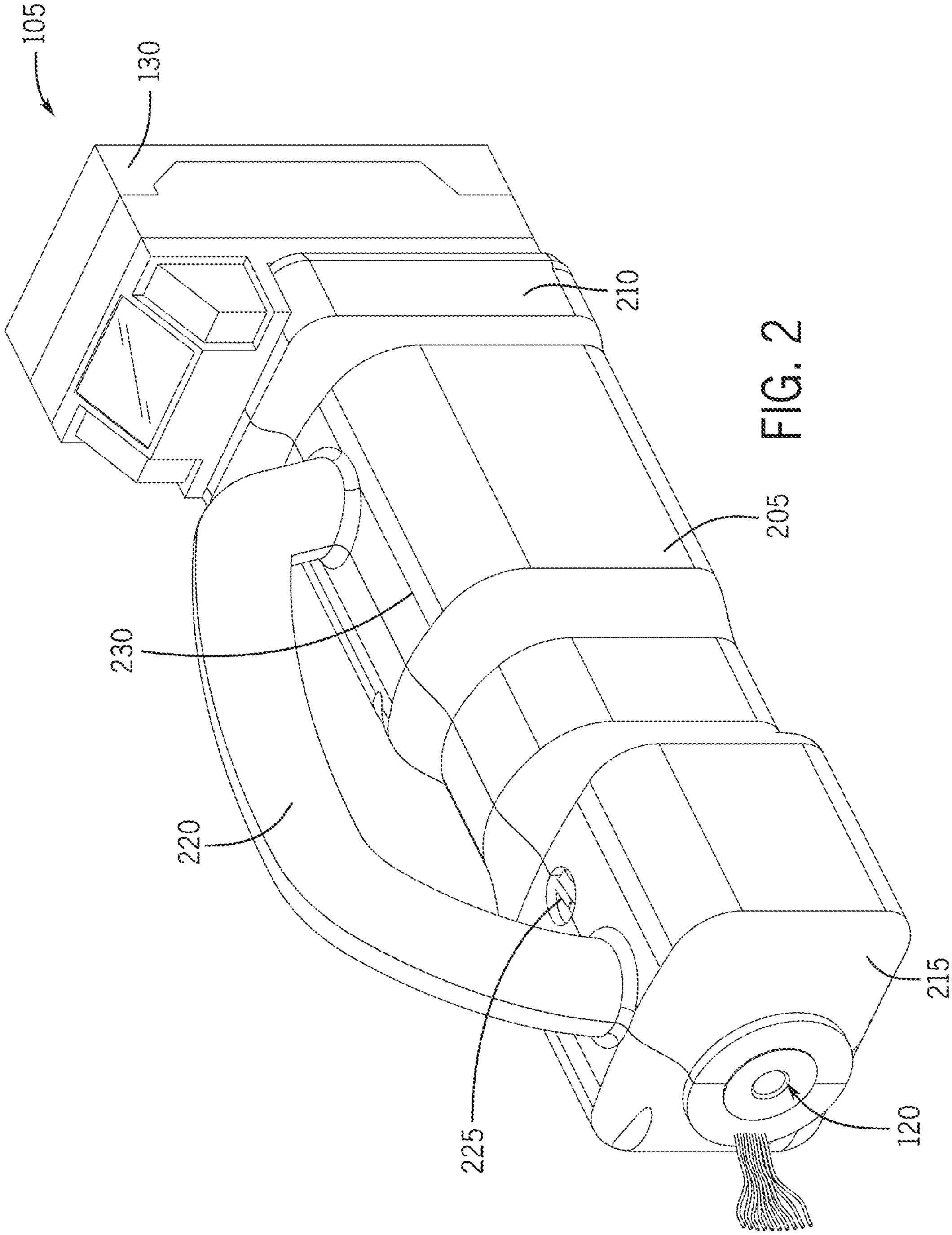
FIG. 2 is an isometric view of one example of a pump of the hydraulic tool of FIG. 1.
Figure 3:
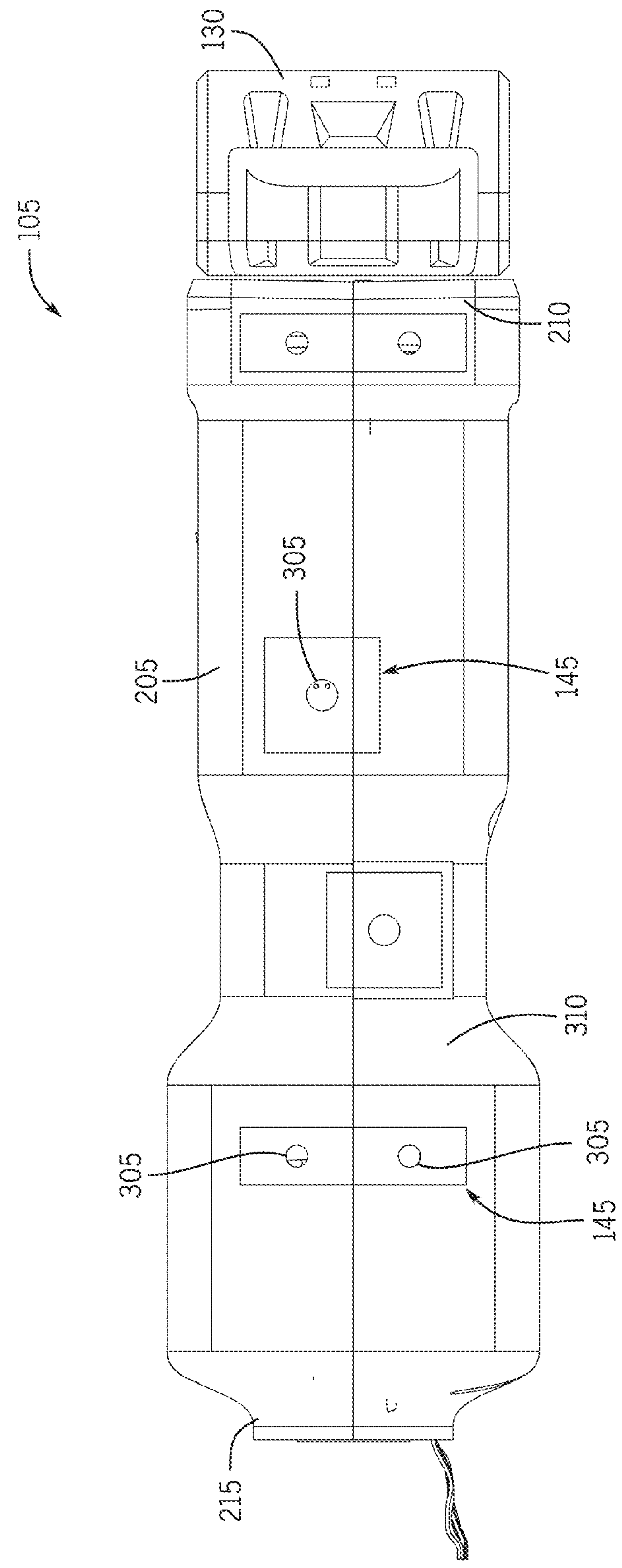
FIG. 3 is a side view of the pump of FIG. 2.

FIGS. 2-3 show an example of the pump 105 including a housing 205 with a first end 210 and a second end 215. In some examples, the housing 205 may be a clamshell type housing with a handle 220 extending from a first side 230 the housing 205, between the first end 210 and the second end 215 of the housing. In one example, the handle 220 may define an arcuate, substantially semi-circular, shape. However, in other examples, the shape of the handle 220 may be different. Alternatively, the pump 105 may not include a handle 220. In some examples, the handle 220 may permit a user to carry the pump 105 without undue fatigue.

In some examples, as mentioned previously, the housing 205 may include the mounting assembly 145, which may be positioned on a second side 310 of the housing 205. The mounting assembly 145 may be positioned opposite of the handle 220, so that during use of the handle 220, the pump 105 may be easily set down on the second side 310 (e.g., to facilitate use of the mounting assembly 145). In some examples, the mounting assembly 145 may include one or more magnets 305 positioned within the housing 205. In one example, the magnets 305 may permit a user to removably secure the pump 105 to or adjacent to a work surface. For example, a user may secure the pump 105 to a metallic work surface via the one or more magnets 305 to reduce overall fatigue (e.g., from carrying the pump 105). Additionally, securing the pump 105 adjacent the work surface may reduce an overall length of hose 115 needed between the pump 105 and the head 110.

In some examples, the power source 130 may be removably secured to the first end 210 of the pump 105. For example, a rechargeable battery (e.g., a lithium-ion battery, etc.) may be removably secured to the first end 210 of the pump 105. Correspondingly, the outlet port 120 may be positioned at the second end 215 of the pump, opposite the first end 210. As mentioned previously, the outlet port 120 may permit hydraulic fluid (e.g., pressurized hydraulic fluid) from within the pump 105 to flow into the hose 115 and to the head (e.g., to perform a work operation). In some examples, in order to release hydraulic fluid from the head (e.g., to depressurize the head 110), the housing 205 may include a release button 225. The release button 225 may be positioned underneath the handle 220 so that the button 225 is at least partially obstructed. Thus, the risk of accidentally actuating the release button 225 may be mitigated. In some examples, the release button 225 may permit an operator to dump (e.g., release) pressurized hydraulic fluid from the hose 115 and the head 110.

Figure 4:
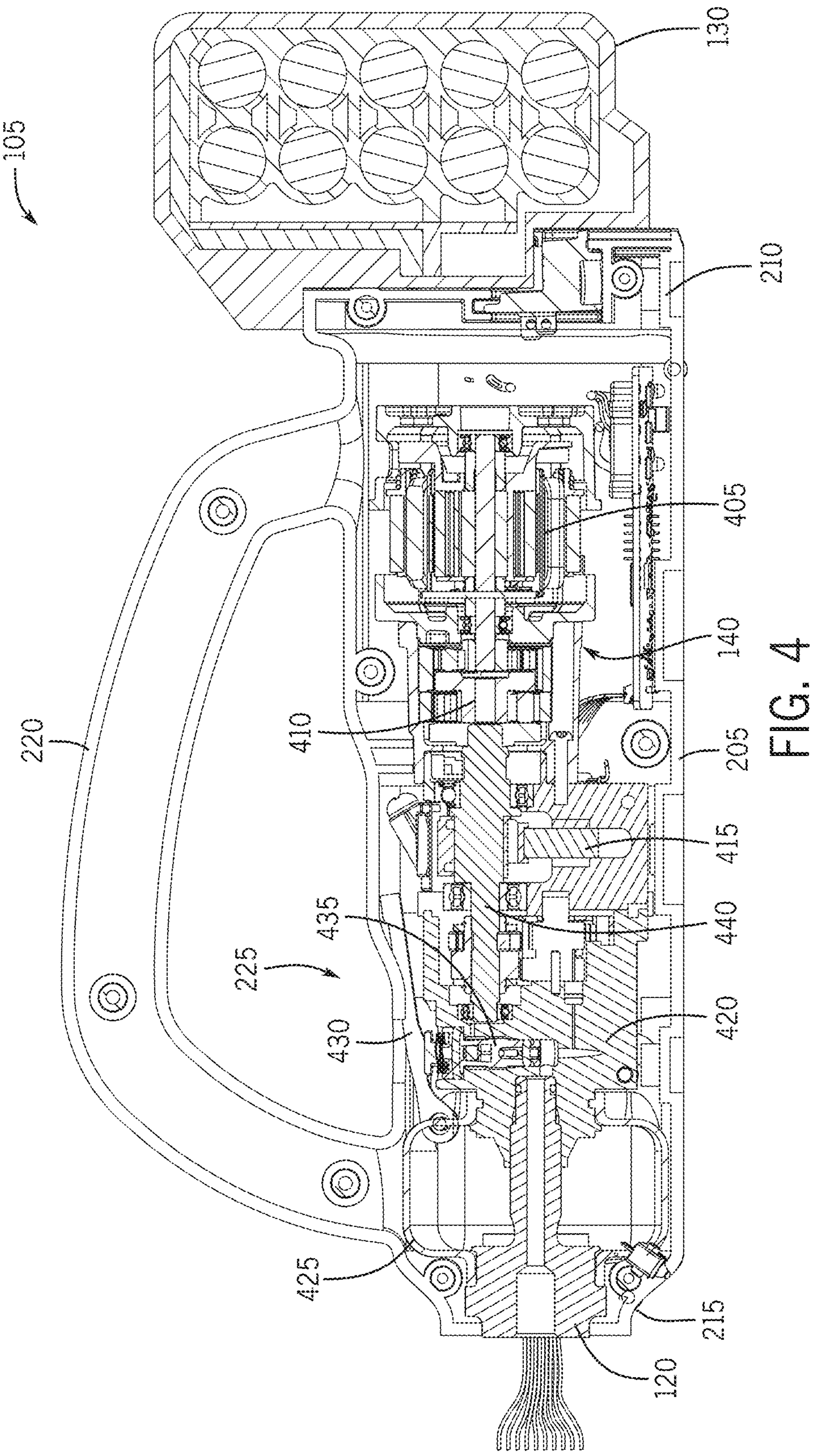
FIG. 4 is a cross-sectional view of the pump of FIG. 2.

FIG. 4 shows a cross-sectional view of the housing 205 of the pump 105. In some examples, as mentioned previously, the power source 130 may provide power to the powertrain 140, which may include an electric motor 405 configured to receive power (e.g., electrical power) from the power source 130. In response to the power from the power source 130, the electric motor 405 may rotate, which may elicit corresponding rotation in one or more gears 410. In some examples, the gears 410 may increase or decrease an overall torque outputted from the electric motor 405. In some examples, the gears 410 may impart rotational movement to a shaft 440, which may generate linear movement of a piston 415. In some examples, the piston 415 may be used to pressurize hydraulic fluid within the pump 105. In some examples, the motor 405 may be directly connected to the shaft 440, without the one or more gears 410.

In some examples, the pump 105 may include a manifold 420 configured to guide or direct pressurized fluid out of the outlet port 120 and through the hose 115 to the head 110. In some examples, in order to retain hydraulic fluid within the pump (e.g., when the pump is not in use) the pump 105 may further include a reservoir 425 arranged between the manifold 420 and the outlet port 120. The reservoir 425 may be configured to retain hydraulic fluid for use by the tool 100. However, during periods of use, hydraulic fluid stored in the reservoir 425 may be pressurized by the piston 415 and directed through the manifold 420, outlet port 120, and to the head 110. In some examples, to return hydraulic fluid from the head 110 to the reservoir 425, the operator may actuate the release button 225. In some examples, actuation of the release button 225 may pivot a lever 430 and trigger (e.g., open) a valve 435, which may permit hydraulic fluid to return to the reservoir 425 (e.g., from the hose 115 or the head 110).

Figure 5:
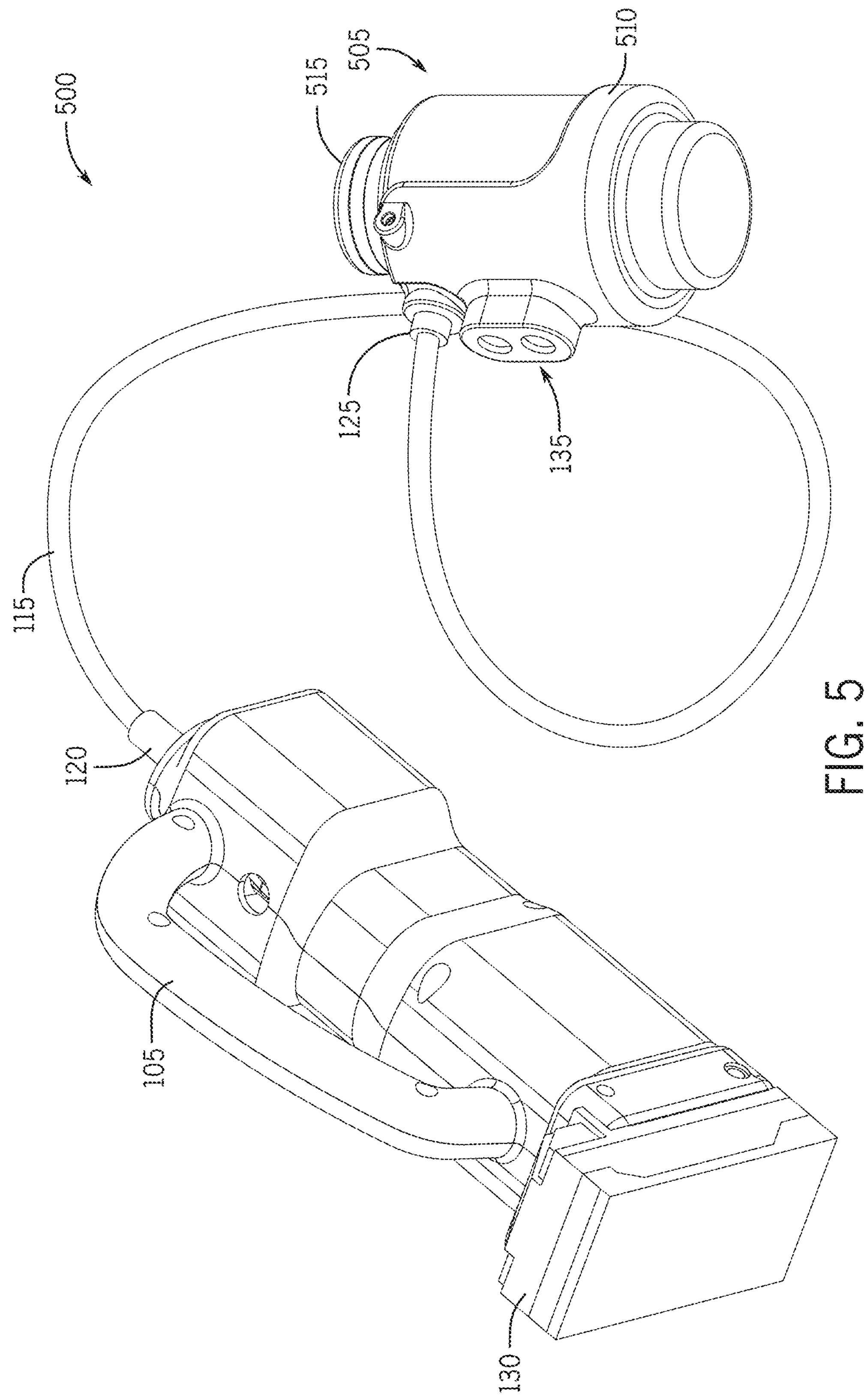
FIG. 5 is an isometric view of one example of the hydraulic tool of FIG. 1.

FIG. 5 illustrates a particular example of a hydraulic tool 500 (e.g., as a particular configuration of the schematically-illustrated hydraulic tool 100). As will be recognized, the tool 500 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the tool 500.

In one example, the hydraulic tool 500 may be in the form of a hydraulic knockout punch. The knockout punch may include a head 505 secured to the hose 115 and configured to receive pressurized hydraulic fluid from the pump 105. In some examples, the head 505 may include a body 510 and a cutting die 515, which may be controlled via the controls 135. For example, the controls 135 may operate the cutting die 515 to cut (e.g., punch) a hole in a workpiece. In one particular example (e.g., with respect to the hydraulic knockout punch), the cutting die 515 may be removably connected to the body 510, so that the cutting die 515 may be interchanged by a user to modify a size of the hole created by the tool 500. For example, interchanging the cutting die 515 may permit a user to select a predetermined hole size (e.g., diameter) based on the needs of a user.

Figure 6:
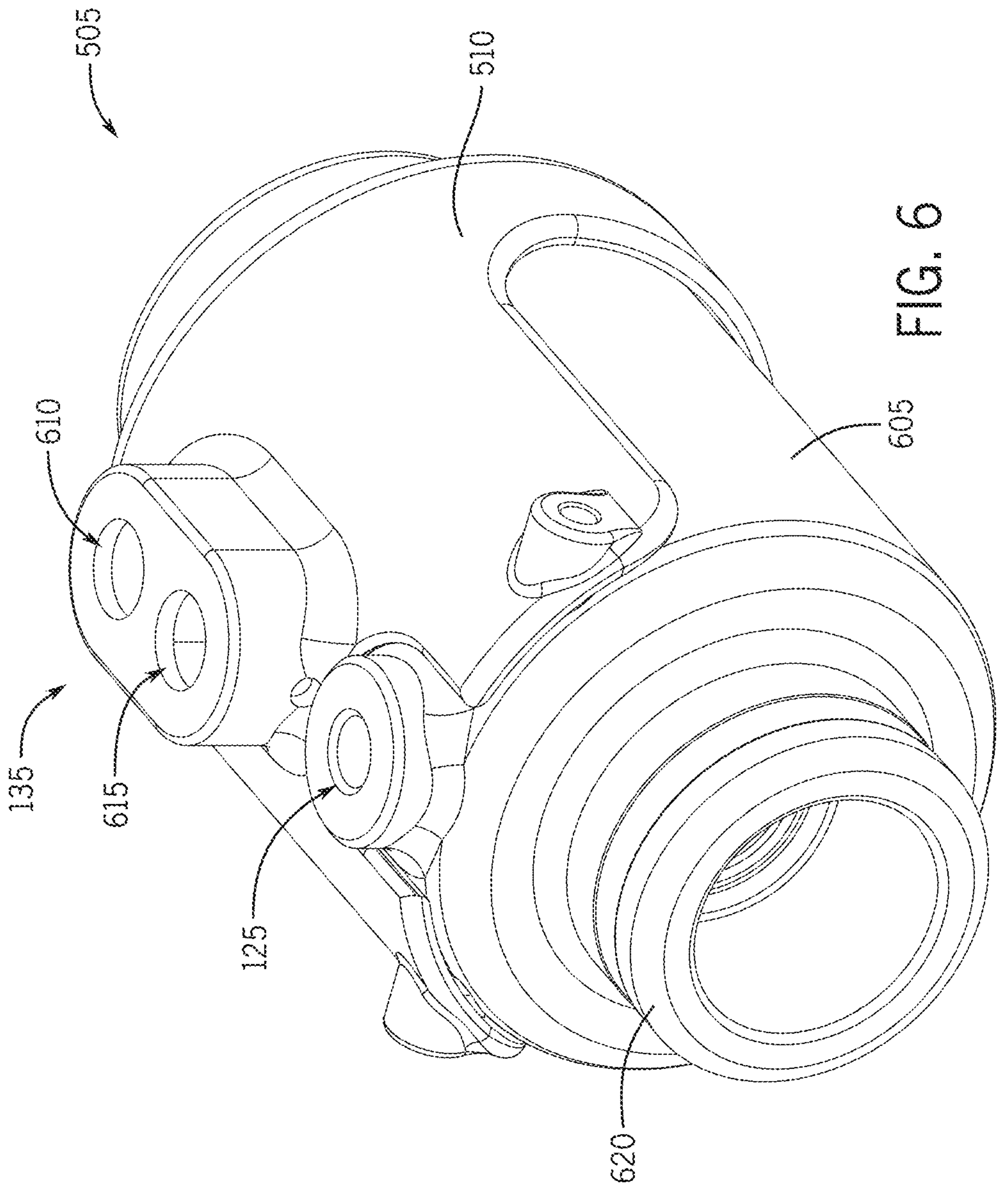
FIG. 6 is an isometric view of one example of a head for use with the hydraulic tool of FIG. 5.

FIG. 6 shows one example of the head 505 for use with the hydraulic tool 500, with the cutting die 515 removed. The head 505 may include a body 510 sized according to an overall pressure value of the head 505. For example, if the head 505 has a maximum-rated pressure value of 5 tons, the body 510 may be smaller than a head with a maximum-rated pressure value of 10 tons. In one example, the head 505 may include a cylinder 605 arranged within the body 510. The cylinder 605 may include a mounting flange 620 extending outward, away from the body 510. The mounting flange 620 may be configured to receive the cutting die 515 to permit the tool 500 to create an opening (e.g., punch a hole) in a desired material. In some examples, the cutting die 515 may be threadedly connected to the head 505. In other examples, the cutting die 515 may be press-fit or otherwise connected to the head 505.

As mentioned previously, to facilitate cutting of the desired material (e.g., punching a hole), the head 505 may receive pressurized hydraulic fluid from the pump 105 via the hose 115. The hose 115 may deposit pressurized hydraulic fluid into the head 505 via the inlet port 125. In some examples, to control the flow of pressurized hydraulic fluid into or out of the head 505, the head 505 may include the one or more controls 135. For example, the head 505 may include a return control button 610 and a run control button 615. The return control button 610 may be configured to control the return of hydraulic fluid from the head 505 back to the pump 105 (e.g., via the hose 115). For example, the return control button 610 may open a valve (e.g., the valve 435) to permit hydraulic fluid to return to the reservoir 425. Correspondingly, the run control button 615 may be configured to control the flow of pressurized hydraulic fluid from the pump 105 to the head 505 (e.g., via the hose 115). For example, the run control button 615 may be configured to activate the motor 405 of the pump 105, which may generate increasing hydraulic fluid pressure and supply pressurized hydraulic fluid to the head 505.

As mentioned previously, the pump 105 and the head 505 may be physically separated via the hose 115, so that the head 505 may be moved independently of the pump 105. Thus, an operator may only need to fit the smaller-sized head 505 (e.g., relative to the pump 105) into a work area in order to perform work on a workpiece. Additionally, the operator may only need to maneuver (e.g., lift or otherwise move) the head 505 to create an opening in a desired material. Thus, overall user fatigue and injury risk may be reduced. Further, the modularity of the pump 105, head 505, and the hose 115 may enable the swapping of various pumps, heads, or hoses based on an intended use of the tool 500. For example, the operator may swap the head 505 for another head (e.g., a cutting head, a PEX expanding head, a crimping head, etc.) depending on an intended use case.

Figure 7:
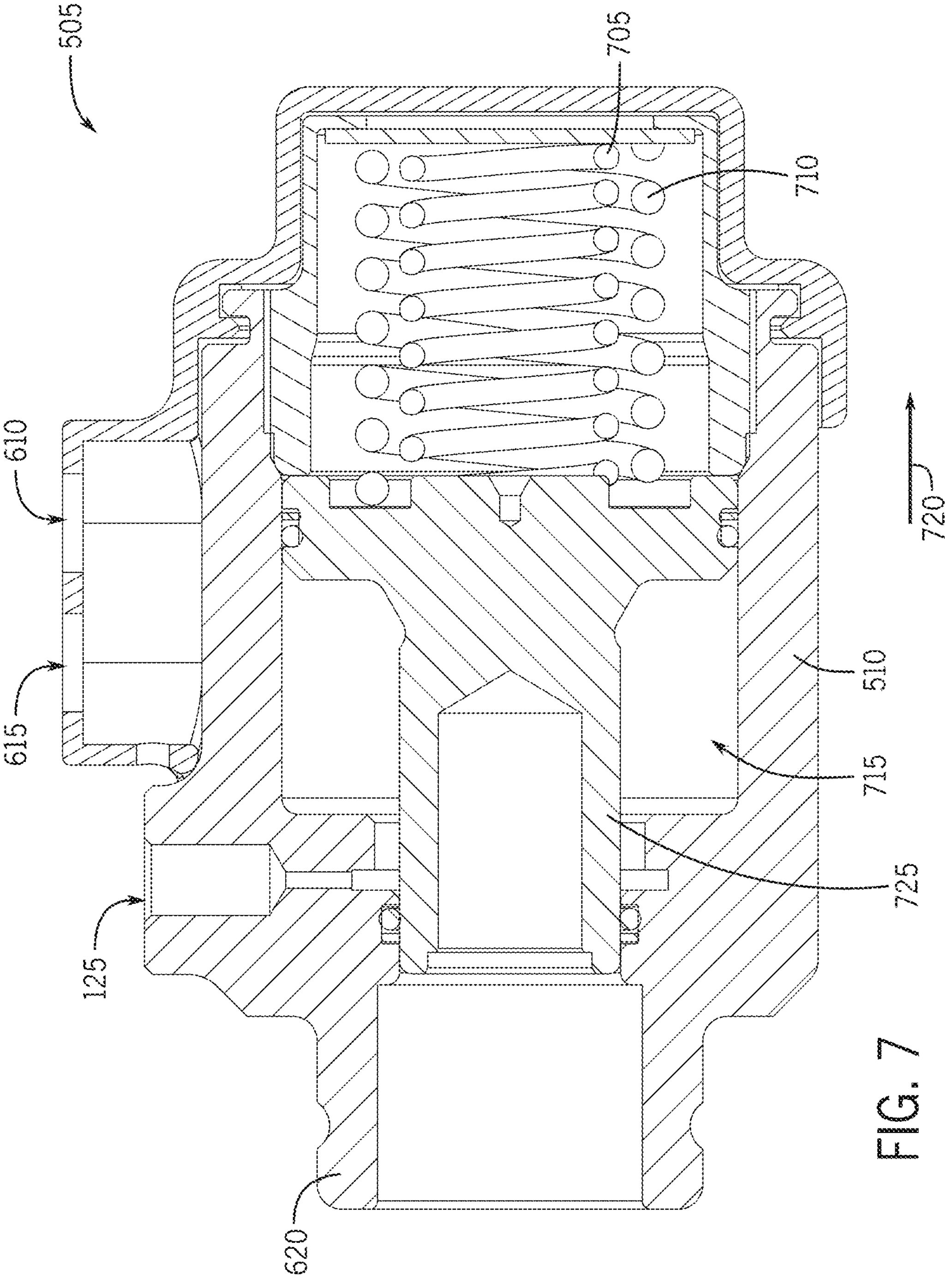
FIG. 7 is a cross-sectional view of the head of FIG. 6.

FIG. 7 shows a cross-sectional view of the head 505. In some examples, during use of the tool 500, pressurized hydraulic fluid may flow into the inlet port 125 of the head 505 (e.g., when actuating the run control button 615). The pressurized hydraulic fluid may flow into an internal chamber 715 of the head 505 and continue to fill the internal chamber 715 until the pressure within the chamber 715 is greater than a biasing force supposed to a piston 725 of the head 505. In some examples, the biasing force suppled to the piston 725 may be generated by one or more springs (e.g., a first spring 705 and a second spring 710). However, in other examples, other biasing members (e.g., wave springs, disk springs, biasing materials, etc.) may be used.

As the pressure in the chamber 715 continues to increase (e.g., due to the additional hydraulic fluid from the pump 105), the piston 725 may be actuated in the direction shown by arrow 720. For example, the biasing force of the springs 705, 710 may be overcome by the pressure of the fluid within the chamber 715. Thus, the cutting die 515 may move in the direction shown by arrow 720 in order to cut a hole into the workpiece. In some examples, once the cutting process is completed, the operator may actuate the return control button 610 to release the hydraulic fluid from the chamber 715 and return the fluid to the pump 105.

Figure 8:
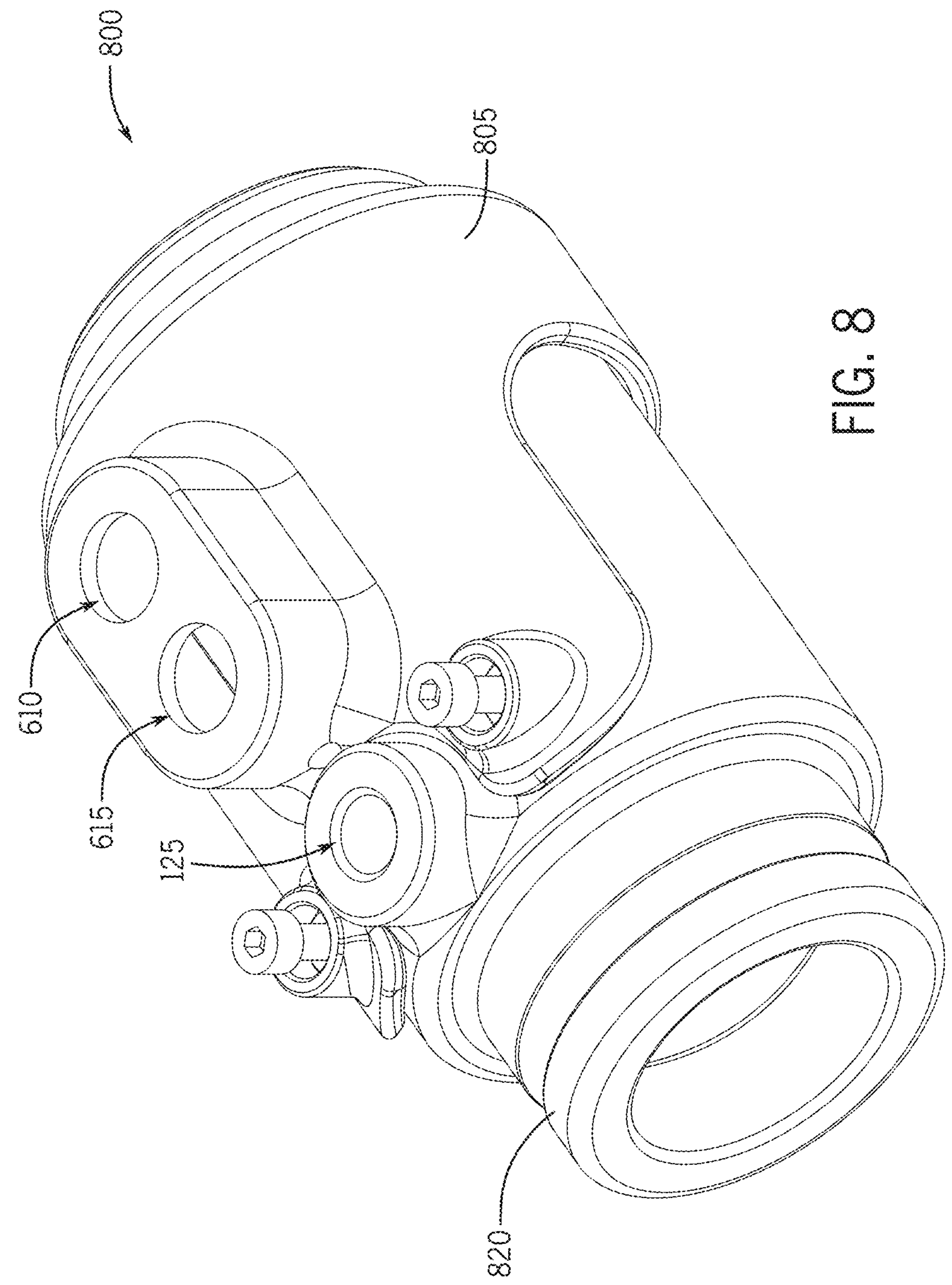
FIG. 8 is an isometric view of another example of a head for use with the hydraulic tool of FIG. 5.
Figure 9:
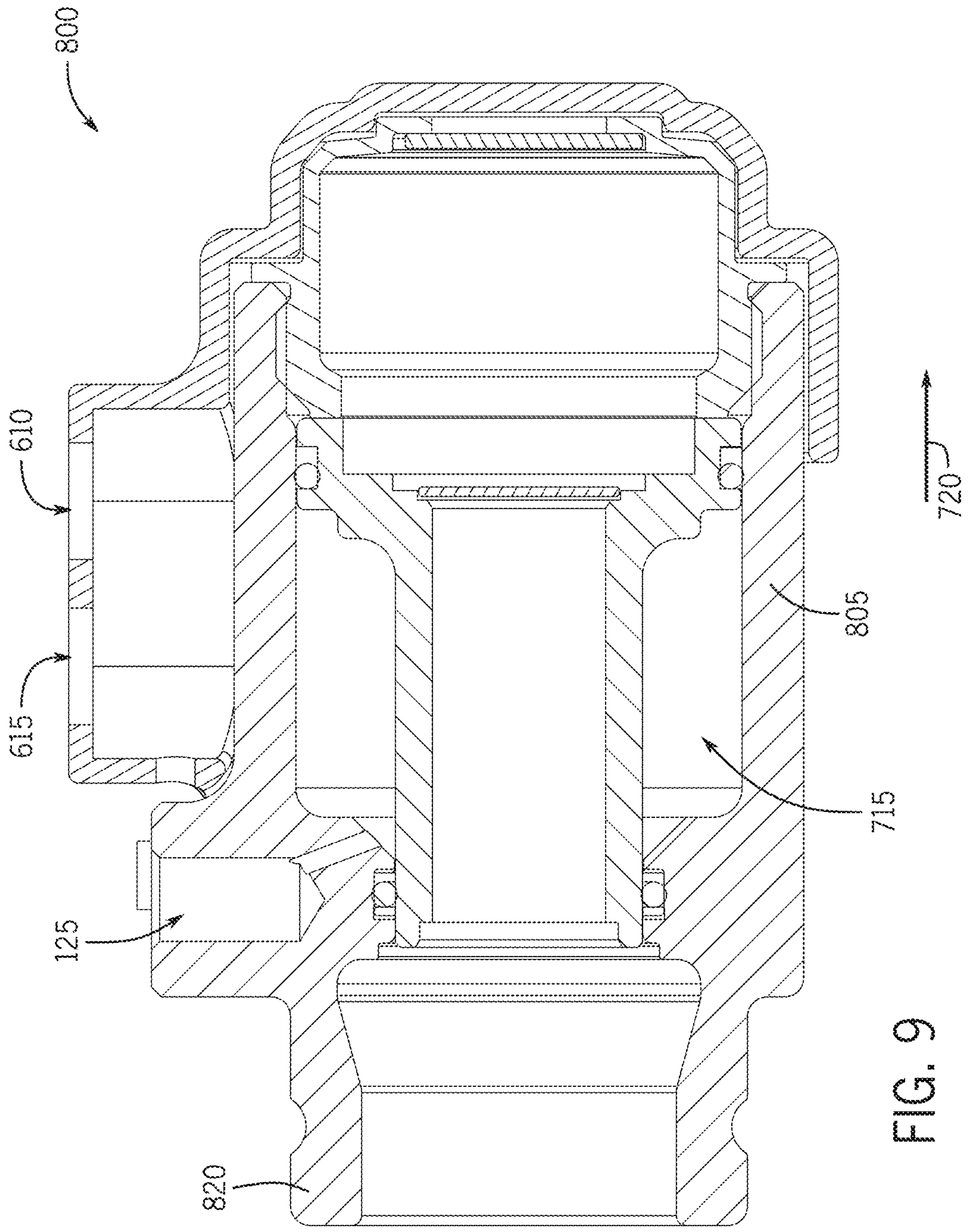
FIG. 9 is a cross-sectional view of the head of FIG. 8.

FIGS. 8 and 9 illustrate another example of a head 800 that can be used with the hydraulic tool 500 of FIG. 5 (e.g., as an alternative configuration of the head 505). As will be recognized, the head 800 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the head 800.

In some examples, the head 800 may include a body 805 that is dimensionally smaller than the body 510. Correspondingly, the head 800 may include a mounting flange 820 that is likewise dimensionally smaller than the mounting flange 620 described previously. In some examples, the body 805 and mounting flange 820 may be smaller due to the head 800 having a smaller maximum-rated pressure than the head 505. For example, the head 505 described previously may have a maximum-rated pressure of 10 tons, while the head 800 may have a maximum-rated pressure of 6 tons. Correspondingly, the head 505 may be designed to create larger-diameter openings in thicker, heavier gauge materials, while the head 800 may be designed to create smaller-diameter openings in thinner, lighter gauge materials. As should be appreciated, the heads may be interchangeable with the pump 105 and hose 115 depending on the intended use case. Thus, an operator may utilize heads with maximum-rated pressures ranging from 0 tons to 30 tons, inclusive. Further, the operator may utilize heads ranging from PEX expanders, crimpers, cutters, knockout punches, or any other hydraulically operated head as desired depending on the use case.

Figure 10:
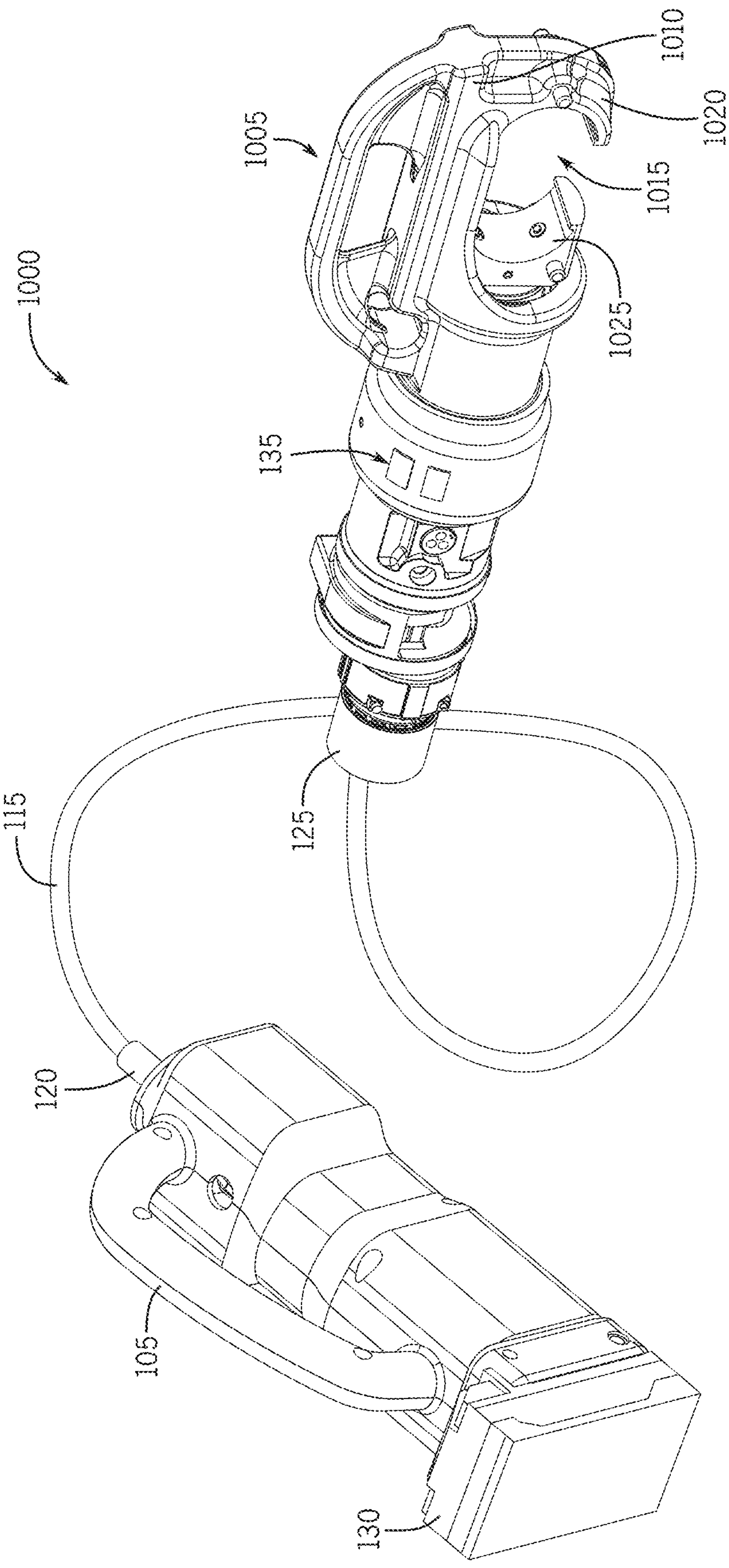
FIG. 10 is an isometric view of another example of the hydraulic tool of FIG. 1.

FIG. 10 illustrates another particular example of a hydraulic tool 1000 (e.g., as a particular configuration of the schematically-illustrated hydraulic tool 100). As will be recognized, the tool 1000 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the tool 1000.

In one example, the hydraulic tool 1000 may be in the form of a hydraulic crimper/cutter tool. The crimper/cutter tool may include a head 1005 secured to the hose 115 and configured to receive pressurized hydraulic fluid from the pump 105. In some examples, the head 1005 may include one or more jaws forming a C-shaped body 1010 defining an opening 1015. For example, the opening 1015 may be defined by the one or more jaws including a first jaw 1020 (e.g., a fixed jaw) and a second jaw 1025 (e.g., a moveable jaw). In some examples, the second jaw 1025 may receive a crimping or a cutting die depending on the intended use case of the tool 1000.

In some examples, actuation of the second jaw 1025 may be controlled via the controls 135. For example, the controls 135 may operate the second jaw 1025 to perform a cut or crimp on a workpiece. In some examples, both the first and second jaws 1020, 1025 may be moveable jaws actuated via the flow of hydraulic fluid into the head 1005. In other examples, only one of the first and second jaws 1020, 1025 may be moveable jaws actuated via the flow of hydraulic fluid into the head 1005, while the other jaw may remain fixed (e.g., be a component of the body 1010).

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of" For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within ±12 degrees of a reference direction (e.g., within ±6 degrees), inclusive.

Also as used herein, unless otherwise limited or defined, "substantially perpendicular" indicates a direction that is within ±12 degrees of perpendicular a reference direction (e.g., within ±6 degrees), inclusive.

Also as used herein, unless otherwise limited or defined, “integral” and derivatives thereof (e.g., “integrally”) describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms “about” and “approximately,” as used herein with respect to a reference value, refer to variations from the reference value of ±15% or less, inclusive of the endpoints of the range. Similarly, the term “substantially equal” (and the like) as used herein with respect to a reference value refers to variations from the reference value of less than +10%, inclusive. Where specified, “substantially” can indicate in particular a variation in one numerical direction relative to a reference value. For example, “substantially less” than a reference value (and the like) indicates a value that is reduced from the reference value by 10% or more, and “substantially more” than a reference value (and the like) indicates a value that is increased from the reference value by 10% or more.

Also as used herein, unless otherwise limited or specified, “substantially identical” refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Unless otherwise specifically indicated, ordinal numbers are used herein for convenience of reference, based generally on the order in which particular components are presented in the relevant part of the disclosure. In this regard, for example, designations such as “first,” “second,” etc., generally indicate only the order in which a thus-labeled component is introduced for discussion and generally do not indicate or require a particular spatial, functional, temporal, or structural primacy or order.

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hydraulic tool comprising:

a pump pressurizing hydraulic fluid;

a head removably coupled to the pump, the head defining a chamber that receives pressurized hydraulic fluid from the pump so that a pressure within the chamber overcomes a biasing force applied to a piston by a first spring and a second spring;

a hose between the pump and the head, the hose including a first end and a second end, the hose connected to a pump outlet at the first end and a head inlet at the second end, the hose directing pressurized hydraulic fluid from the pump outlet to the head inlet; and a first control button arranged on the head, the first control button triggering the pump to direct pressurized hydraulic fluid from the pump outlet to the head inlet via the hose.

2. The hydraulic tool of claim 1, further comprising:

an electric power source removably secured to the pump.

3. The hydraulic tool of claim 2, wherein the electric power source is a rechargeable battery.

4. The hydraulic tool of claim 2, further comprising:

a powertrain positioned within the pump, the powertrain to pressurize hydraulic fluid within the pump in response to receiving electric power from the electric power source.

5. The hydraulic tool of claim 1, wherein the first control button is a run control button, and wherein the run control button commands the pump to provide pressurized hydraulic fluid to the head.

6. The hydraulic tool of claim 5, further comprising:

a second control button arranged on the head.

7. The hydraulic tool of claim 6, wherein the second control button is a return control button, and wherein actuation of the return control button provides pressurized hydraulic fluid from the head to the pump.

8. The hydraulic tool of claim 1, wherein the head is removably connected to the second end of the hose to facilitate interchangeability of one or more heads.

9. The hydraulic tool of claim 1, further comprising:

a handle extending from a first side of the pump.

10. The hydraulic tool of claim 9, further comprising:

a mounting assembly arranged on a second side of the pump, opposite the first side of the pump.

11. The hydraulic tool of claim 10, wherein the mounting assembly includes a magnet.

12. A hydraulic tool, comprising:

a pump pressurizing hydraulic fluid stored within the pump;

a head moveable independent of the pump, the head including a body defining an internal chamber that receives a piston, a first spring, and a second spring, the first spring and the second spring applying a first force on the piston, and the internal chamber receiving pressurized hydraulic fluid from the pump so that pressure within the internal chamber overcomes the first force to move the piston;

a hose connected between the pump and the head;

an electric power source removably secured to a second end of the pump; and a first control button arranged on the head, the first control button activating the electric power source to direct pressurized hydraulic fluid from the pump to the head.

13. The hydraulic tool of claim 12, wherein the electric power source is a rechargeable battery.

14. The hydraulic tool of claim 12, further comprising:

a powertrain positioned within the pump, the powertrain to pressurize hydraulic fluid within the pump in response to receiving electric power from the electric power source.

15. The hydraulic tool of claim 12, wherein the first control button is a run control button, and wherein the run control button commands the pump to provide pressurized hydraulic fluid to the head.

16. The hydraulic tool of claim 15, further comprising:

a second control button arranged on the head.

17. The hydraulic tool of claim 16, wherein the second control button is a return control button, and wherein actuation of the return control button provides pressurized hydraulic fluid from the head to the pump.

18. The hydraulic tool of claim 12, further comprising:

a handle arranged on a first side of the pump; and a mounting assembly arranged on a second side of the pump, opposite the first side of the pump;

wherein the mounting assembly includes a magnet.

19. The hydraulic tool of claim 12, wherein the hydraulic tool is one of a crimper/cutter tool, a PEX expander, a knockout punch, or a press tool.

20. A hydraulic tool, comprising:

a pump including a housing with a handle extending from the housing, the pump pressurizing hydraulic fluid stored within the pump;

a head moveable independent of the pump, the head receiving pressurized hydraulic fluid from the pump;

a hose connected between a first end of the pump and the head;

an electric power source removably secured to a second end of the pump;

a powertrain arranged within the pump, the powertrain receiving electric power from the electric power source and pressurized hydraulic fluid within the pump;

a first control button arranged on the head, the first control button activating the pump to direct pressurized hydraulic fluid from the pump to the head;

a second control button arranged on the head, the second control button returning pressurized hydraulic fluid from the head to the pump; and a third control button arranged on the housing of the pump and partially covered by the handle, the third control button releasing pressurized hydraulic fluid from the head to the pump.

* * * * *